United States Patent [19]
Fukui et al.

[11] Patent Number: 5,672,956
[45] Date of Patent: Sep. 30, 1997

[54] STATIC REACTIVE POWER COMPENSATING EQUIPMENT

[75] Inventors: Tsutomu Fukui, Yamatokouriyama; Tokihide Niu, Toyono-gun, both of Japan

[73] Assignee: Matsushita Electric Industrial Co., Ltd., Osaka-fu, Japan

[21] Appl. No.: 507,901

[22] Filed: Aug. 3, 1995

[30] Foreign Application Priority Data

Aug. 8, 1994 [JP] Japan ................................ 6-185557

[51] Int. Cl.$^6$ ............................................. G05F 1/70
[52] U.S. Cl. ................................... 323/210; 323/209
[58] Field of Search ............................ 323/205, 208, 323/209, 210; 363/39

[56] References Cited

U.S. PATENT DOCUMENTS

| | | | |
|---|---|---|---|
| 4,513,240 | 4/1985 | Putman | 323/210 |
| 4,555,659 | 11/1985 | Gyugyi | 323/210 |
| 4,602,200 | 7/1986 | Walker | 318/798 |
| 4,686,447 | 8/1987 | Takeda et al. | 323/210 |
| 4,752,726 | 6/1988 | Aoyama | 323/207 |
| 4,891,570 | 1/1990 | Nakamura et al. | 323/210 |
| 4,999,565 | 3/1991 | Nilsson | 323/210 |

FOREIGN PATENT DOCUMENTS

| | | |
|---|---|---|
| 61-109426 | 5/1986 | Japan . |
| 3-113521 | 5/1991 | Japan . |

*Primary Examiner*—Adolf Berhane
*Attorney, Agent, or Firm*—Panitch Schwarze Jacobs & Nadel, P.C.

[57] ABSTRACT

A static reactive power compensating equipment includes a circuit for preventing harmonic currents generated by adjusting lag compensation current from phase control from flowing out of the equipment. A first reactor and a controller are connected to a switching circuit. A second reactor is connected between an output terminal and a connection node. The first reactor is also connected to the connection node such that the first and second reactors are series connected. A resonant circuit including a third reactor connected in series with a capacitor is connected to the connection node such that the resonant circuit is series connected with the second reactor and parallel connected to the first reactor. The resonant circuit is constructed to resonate at a predetermined frequency which substantially absorbs harmonic currents flowing from the static reactive power compensating equipment.

10 Claims, 9 Drawing Sheets

STATIC REACTIVE POWER COMPENSATING EQUIPMENT

FIELD OF THE INVENTION AND RELATED ART STATEMENT

1. Field of the Invention

The present invention relates to a static reactive power compensating equipment to be connected to an electric power system.

2. Description of the Related Art

In general, in an electric power system to which a load of considerably fluctuating reactive power is connected, the voltage at a node of the load fluctuates in response to the current flowing in the load. A static reactive power compensating equipment is installed for the purpose of suppressing such voltage fluctuations. The static reactive power compensating equipment is basically constituted of a parallel connection circuit of capacitors and reactors and compensates for the reactive power by offsetting or canceling a load's reactive current flowing in the load by means of a leading current flowing in the capacitor when the load's reactive current is lagging current, and offsetting or canceling the load's reactive current flowing in the load by means of lagging current flowing in the reactor when the load's reactive current is leading current. In the static reactive power compensating equipment of the prior art, in order to continuously and automatically compensate in a range from lagging phase region to leading phase region, a current controlling switching circuit is inserted in the reactor circuit, and phase control is applied to the switching circuit in accordance to the reactive current flowing in the load, so as to adjust the lagging current in a range from 0 to the maximum value.

In the basic configuration of the prior art, capacitances of the capacitors and the reactors were extremely great. In order to improve such drawback, the static reactive power compensating equipment disclosed in Japanese Published Unexamined Patent Application No. Sho 61-109426 proposed a parallel circuit of capacitors and reactors whereto other reactors were connected in series via switching elements, thereby to reduce the total volume of the capacitors, the reactors and a thyristors which constitute the equipment.

In the prior art described above, executing of phase control of the thyristor causes harmonic currents to flow out of the static reactive power compensating equipment. It is known that the most dominant and adverse component of the harmonic currents that flow out are the fifth harmonic currents, followed by the seventh harmonic current. Consequently, the prior art has such problems as adverse effects which affects other facilities connected to the electric power system to which the static reactive power compensating equipment is connected, and hence the necessity to install an outside harmonics protection apparatus to prevent the adverse effects.

OBJECT AND SUMMARY OF THE INVENTION

The present invention intends to solve the problems of the prior art described above, and has an object of providing a static reactive power compensating equipment that prevents the harmonic currents which were generated by adjusting lag compensation current from phase control, from flowing out of the equipment. Thereby the drawbacks described above is eliminated and the practical usefulness thereof is much improved.

In order to solve the above-mentioned object the static reactive power compensating equipment comprises at least a first reactor having a first end and a second end;

at least one switching circuit electrically connected to a controller;

at least a second reactor having a first end electrically connected to an output terminal and a second end electrically connected to a connection node (N), wherein the at least a first reactor first end is electrically connected to the at least one switching circuit and the at least a first reactor second end is electrically connected to the node (N), thereby electrically connecting the at least a first reactor and the at least a second reactor in series;

at least one resonant circuit comprising at least a third reactor and at least a capacitor electrically connected in series, wherein the at least one resonant circuit is electrically connected to the node (N) in series with the at least a second reactor and in parallel with the at least a first reactor, and wherein the at least one resonant circuit resonates at a predetermined resonant frequency which substantially absorbs a harmonic current, thereby decreasing a total ratio of harmonic currents flowing from the static reactive power compensating equipment.

In other mode of the static reactive power compensating equipment, at least one of said first reactor, said second reactor and said third reactor is constituted of windings of a transformer having a desired leakage inductance.

In still other mode of the static reactive power compensating equipment, series connection circuits of said first reactor and said phase-control switching means are connected to constitute a delta connection, in the case of a 3-phase circuit.

In still other mode of the static reactive power compensating equipment, in the case of a 3-phase circuit, respective connection nodes of delta-connected phase control switching means is connected to respective one ends of said first reactor.

The static reactive power compensating equipment having the above-mentioned configuration is capable of decreasing the total harmonic current components that flow out of the static reactive power compensating equipment, because generation of the harmonic current is prevented by series resonance circuit which is comprised of the capacitor and the third reactor.

The present invention has such effects that, in a static reactive power compensating equipment consisting of a first reactor with current flowing therein being controlled by a switching circuit, a capacitor circuit connected in parallel with the first reactor and a second reactor inserted between a node of the first reactor and the capacitor circuit and an output terminal, therein, the capacitor circuit is configured by connecting one set or a plural number of sets, being connected in parallel, of serial resonance circuit comprised of a capacitor and a third reactor, it is made possible to absorb harmonic current in the equipment thereby remarkably reducing the harmonic current which flows out and to decrease the capacitances of the component capacitors and reactors, thus providing an excellent static reactive power compensating equipment.

DESCRIPTION OF THE PREFERRED EMBODIMENTS

First Embodiment

An embodiment of the invention will be described below referring to the accompanying drawings.

Figure 1:
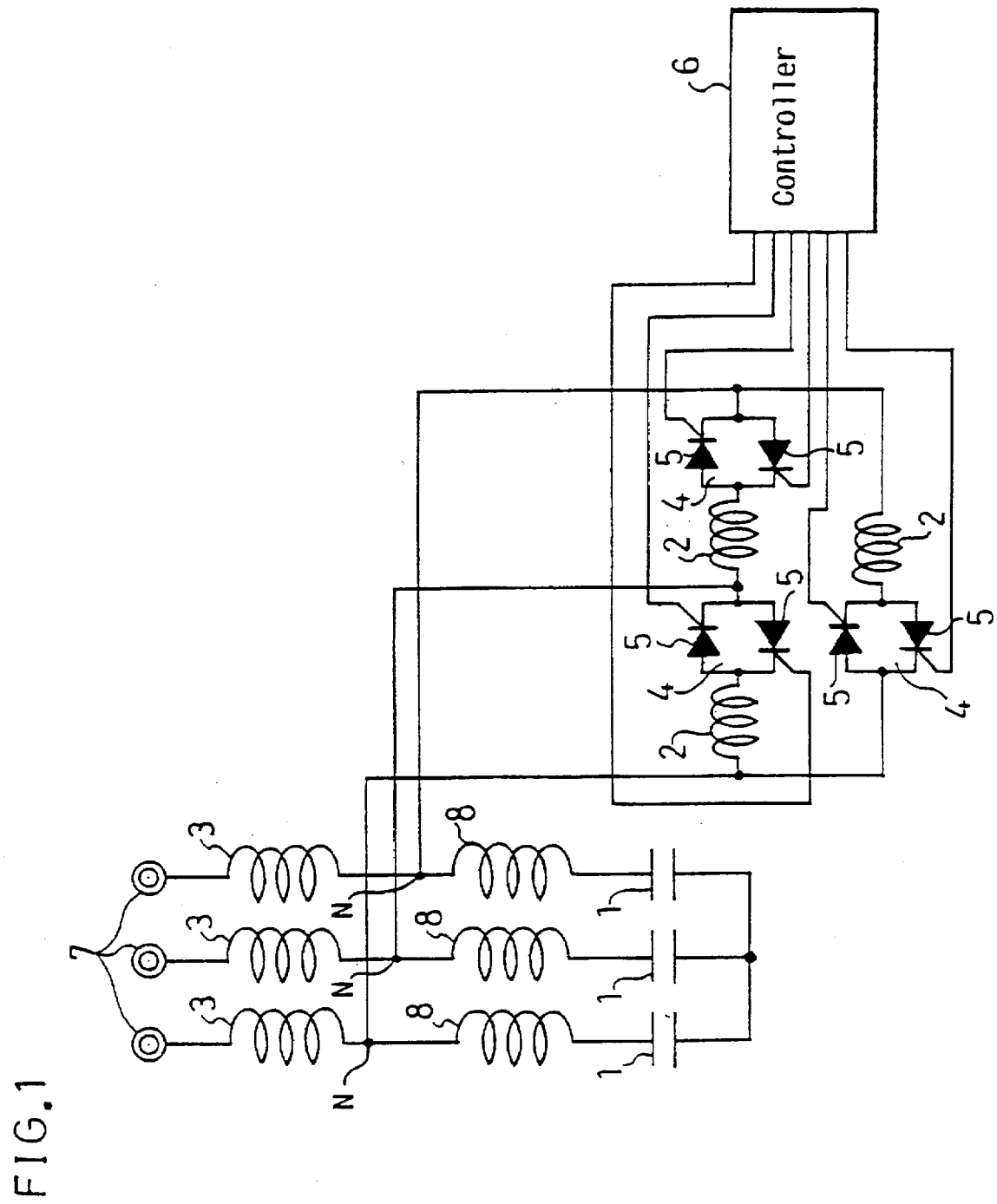
FIG. 1 is a 3-phase connection diagram of the static reactive power compensating equipment of the first embodiment of the invention.
Figure 2:
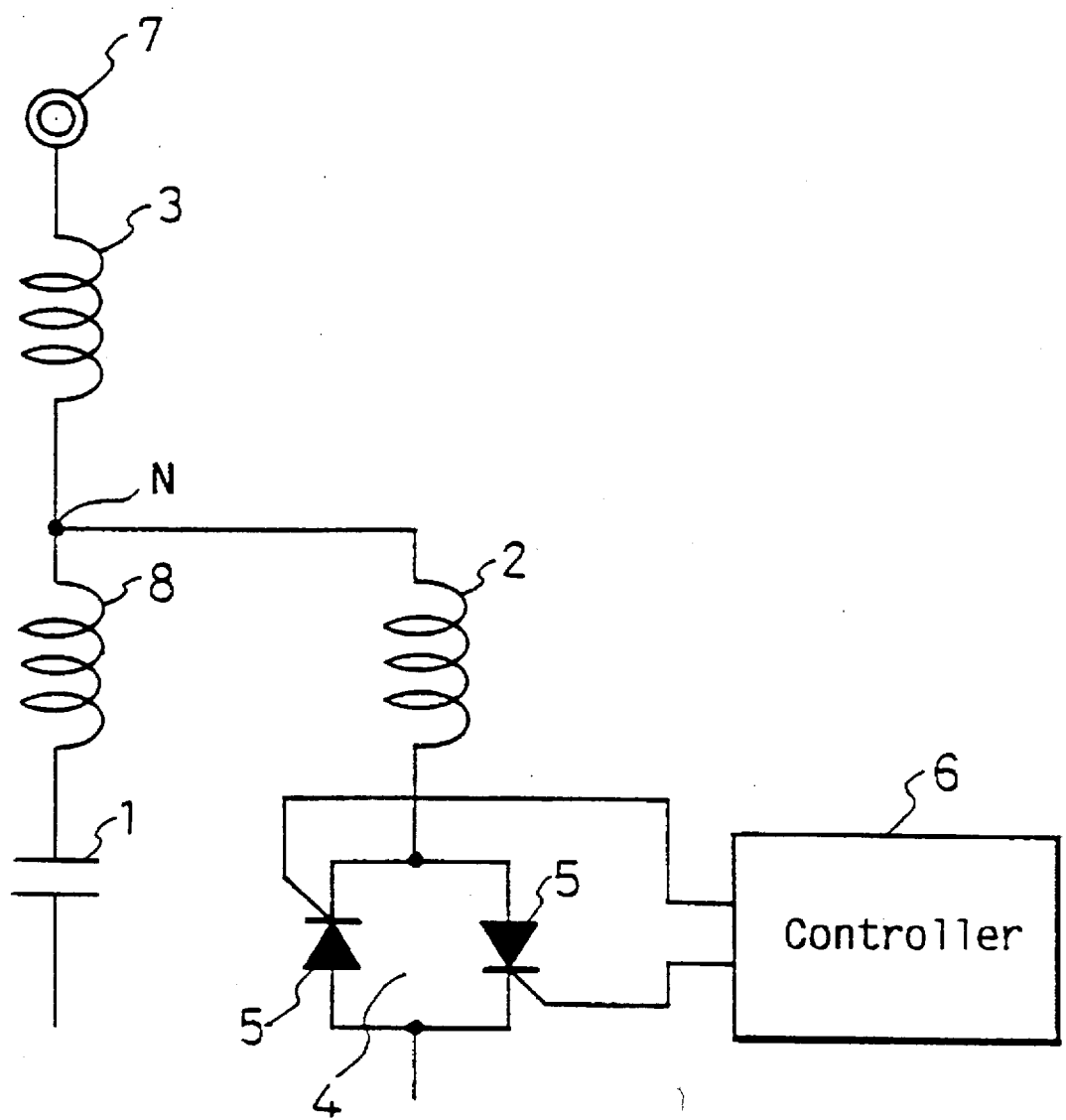
FIG. 2 is a single phase connection diagram of the static reactive power compensating equipment of the first embodiment.

FIG. 1 shows a 3-phase connection diagram of the static reactive power compensating equipment embodying the present invention, and FIG. 2 shows an equivalent circuit connection diagram of a single phase configuration for explanation of operation of the static reactive power compensating equipment shown in FIG. 1.

The embodiment is characterized by addition of a third reactor 8 in series to the capacitors 1. That is, as shown in FIG. 1 and FIG. 2, three capacitors 1 are connected in star connection at their one ends, and to their other ends are connected the third reactors 8. And further, between the other ends of the third reactors 8 and respective output terminals 7 are connected second reactors 3. Three connection nodes N between the second reactors 3 and the third reactors 8 are connected to switching network, which is a Delta connection comprising a first reactor 2 and a switching circuit 4 in each branch. Each switching circuit 4 comprises two thyristors 5 connected in reverse parallel way, and the gates of the thyristors 5 are connected to a controller circuit 6 which gives necessary control signal. In this embodiment, a reactor of 0.257 mH is inserted or added as the third reactor 8 connected in series to the capacitors 1 having a capacitance of 1.088 mF, as the static reactive power compensating equipment of maximum lead compensation power of 300 KVA. The first reactors 2 each have inductance of 2.484 mH, and the second reactors 3 each have inductance of 2.353 mH; and a step-up transformer connected to the output terminals 7 is 660 V:6600 V transformer having transformer reactor of 0.0934 mH.

Operation of the static reactive power compensating equipment in such a configuration as described above will be described below. Because impedance of the third reactor 8 of this embodiment is smaller than the impedance of the first reactor 2, the second reactor 3 and the capacitor 1, operation of this embodiment in the compensating function for the reactive current flowing in the load is substantially equal to the operation of the static reactive power compensating equipment of the prior art. The serial circuit of the capacitor 1 and the third reactor 8 resonates at about 300 Hz which is the fifth harmonic wave arising in an electric power system operating at frequency 60 Hz. Therefore, the fifth harmonic current, which is the most dominant component of the harmonic current generated from the static reactive power compensating equipment during phase control of the thyristor, is absorbed by the serial resonance circuit configured of the capacitor 1 and the third reactor 8. As a result, total ratio of harmonic currents flowing from the static reactive power compensating equipment to the outside system is decreased.

Figure 6A:
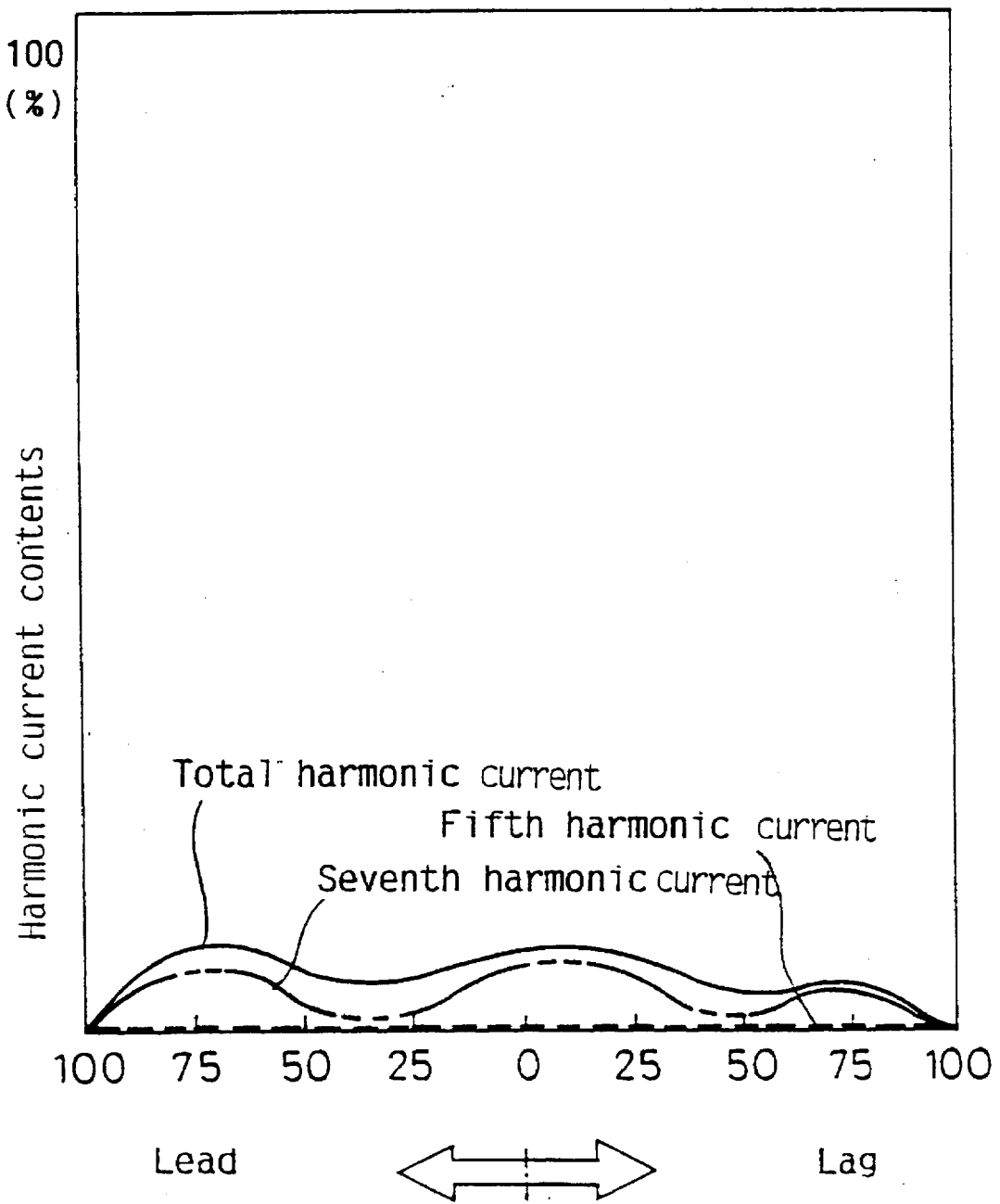
FIG. 6A is a characteristic diagram of the static reactive power compensating equipment of the first embodiment of the invention.
Figure 6B:
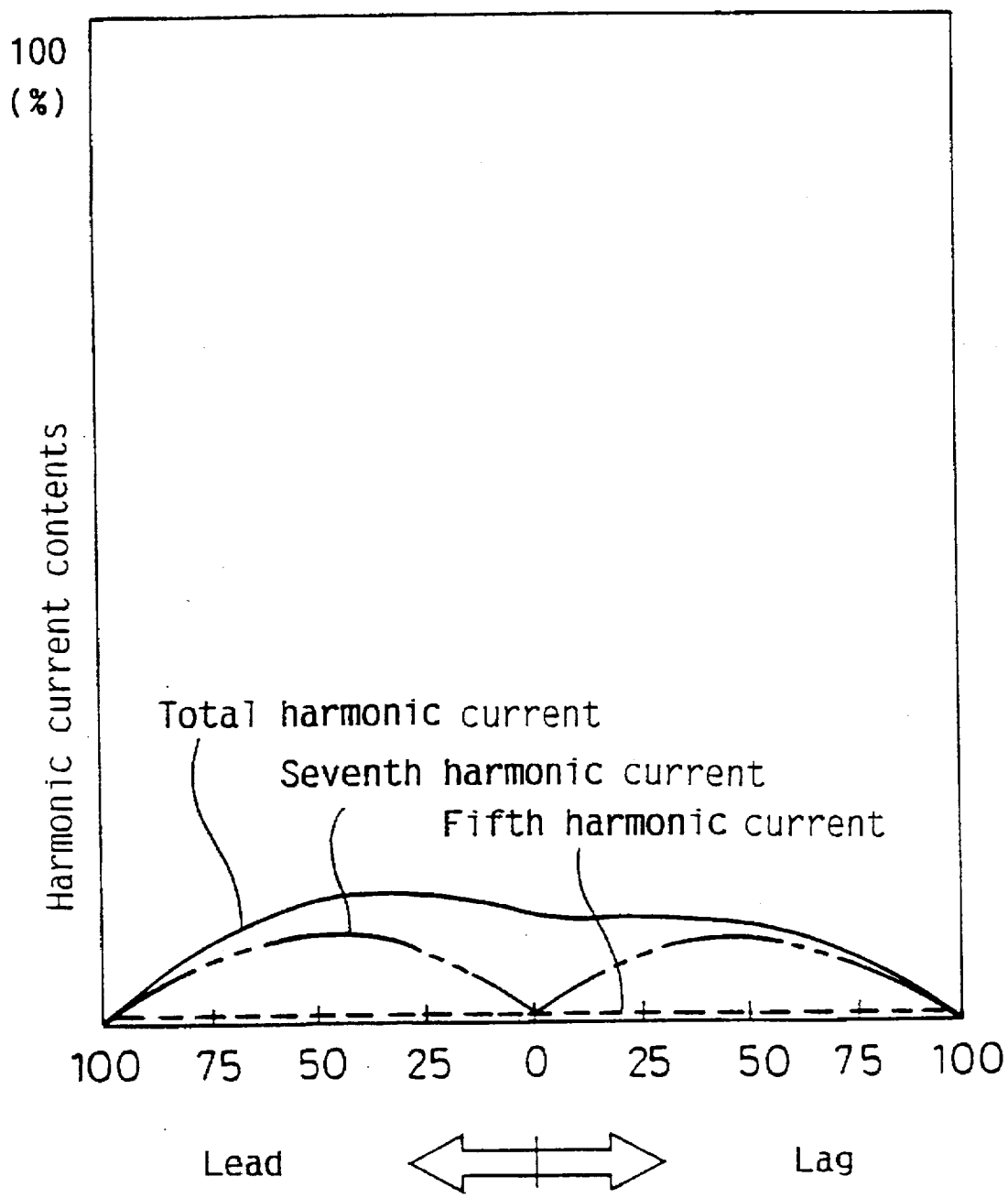
FIG. 6B is a characteristic diagram of the static reactive power compensating equipment of the second embodiment of the invention.
Figure 6C:
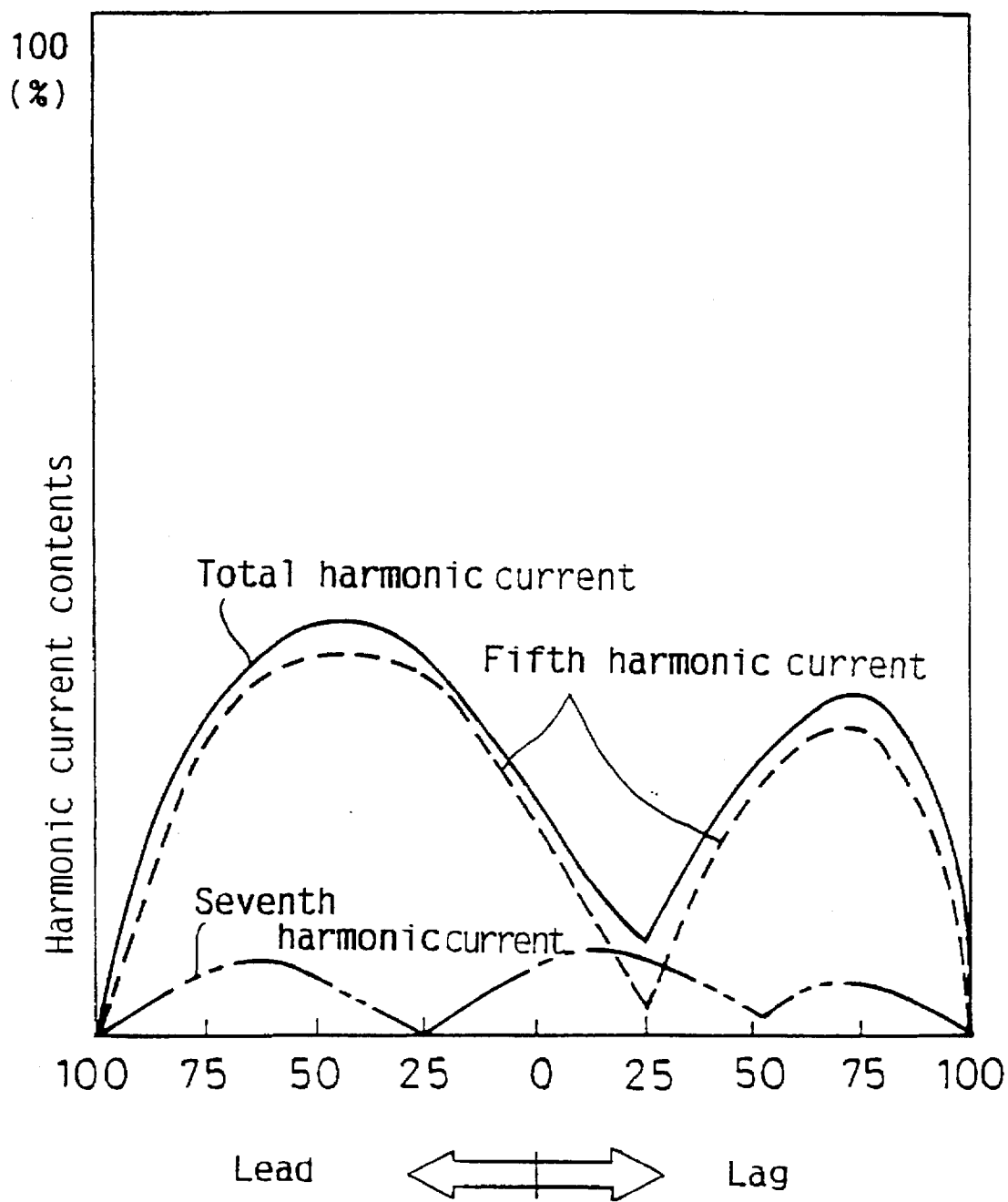
FIG. 6C is a characteristic diagram of the static reactive power compensating equipment of the prior art.
Figure 7:
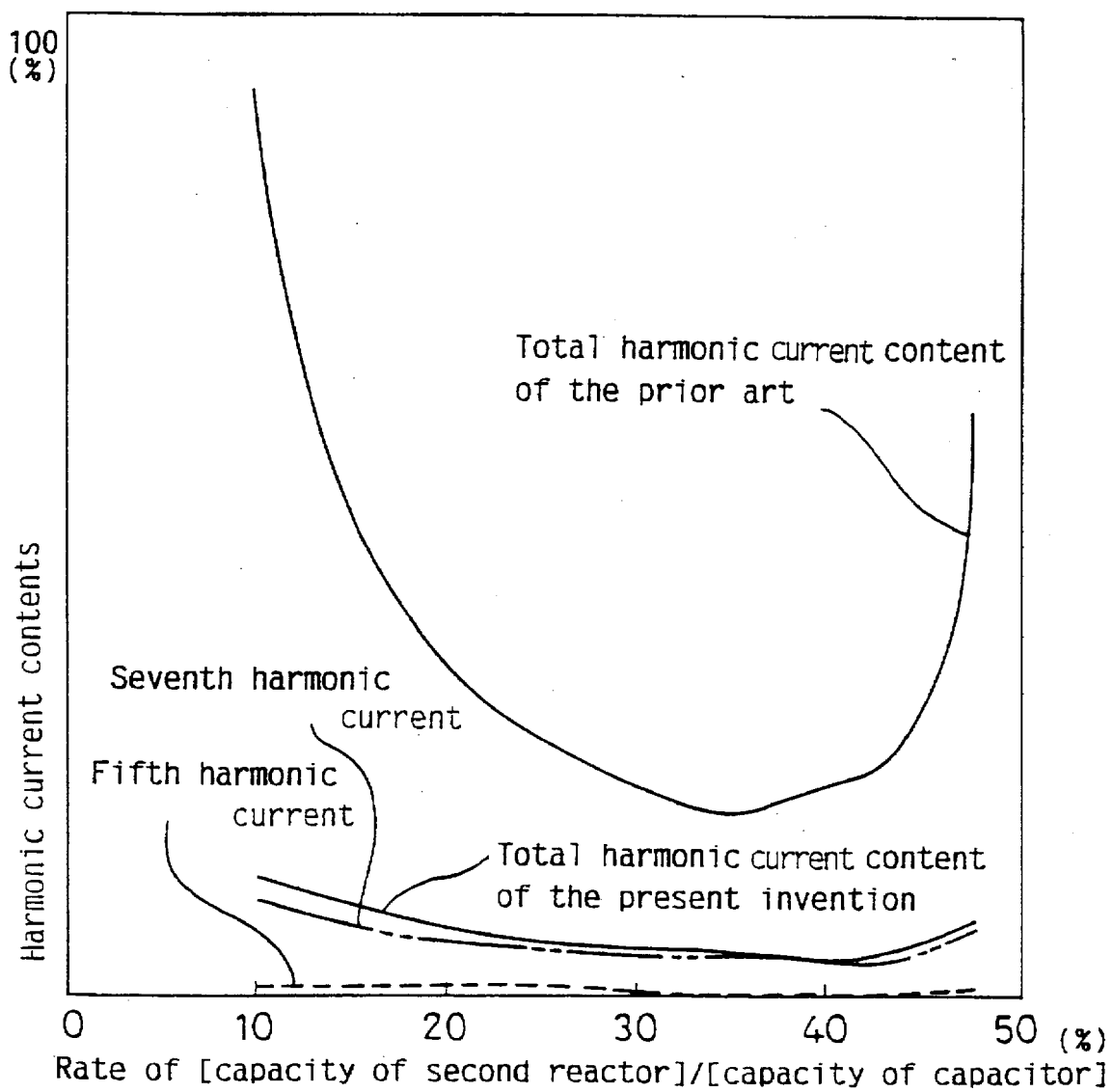
FIG. 7 is a characteristic diagram of the static reactive power compensating equipment.

FIG. 6A, FIG. 6B and FIG. 6C show comparison of a characteristics. The diagram 6A shows characteristic of the static reactive power compensating equipment of this embodiment and diagram 6C shows that of the static reactive power compensating equipment of the prior art which does not have the third reactor 8. The abscissa of each graph of FIG. 6A, FIG. 6B and FIG. 6C is the graduated with compensation current obtained by changing the period of conducting the switching circuit in a range from 100% leading compensation current to 100% lagging compensation current. Each ordinate is graduated with the content(%) of harmonic current in the rated current, and each indicates the content(%) of total harmonic current components and those of the fifth and seventh harmonic current components both accounting for a large part of the former. The harmonic current contents of the compensation current changes as shown in FIG. 7 depending on the ratio of such capacitance of the second reactor 3 that which is set to obtain a specified maximum leading compensation current to the capacitance of the capacitor 1. Therefore, considering the curves of FIG. 7, the ratio of the capacitance of the second reactor 3 to the capacitance of the capacitor 1 is set to the ratio of 38:100 which allows to restrict the harmonic current ratio to a minimum value, thereby to obtain FIG. 6. The abscissa of FIG. 7 is graduated with the ratio in percentage of the capacitance of the second reactor 3 to the capacitance of the capacitor 1. The ordinate is graduated with the content(%) of the harmonic current ratio in the rated current similarly to FIG. 6.

As will be clear from FIG. 6A, FIG. 6B and FIG. 6C, the static reactive power compensating equipment of this embodiment has an excellent effect of rendering the component of the fifth harmonic current of supplied compensation current, and sufficiently lowering the content ratio of the total harmonic currents.

As will also be clear from FIG. 7, when the capacitances of the capacitor 1 and the second reactor 3 are decreased (by decreasing the ratio of [capacitance of the second reactor 3]/[capacitance of the capacitor 1]) so as to obtain the same maximum leading compensation current, in the case of the static reactive power compensating equipment of the prior art the harmonic current greatly increases. On the contrary, in the static reactive power compensating equipment of this embodiment, the harmonic current hardly increases. Hence the static reactive power compensating equipment of this embodiment has an excellent effect and advantage also in reducing the capacitances of the capacitor 1 and the second reactor 3 in an electric power system where harmonic current is permissible to a certain extent.

According to the above-mentioned embodiment, in the static reactive power compensating equipment comprising the first reactor 2 with its current controlled by the switching circuit 4, the capacitor 1 connected in parallel with the first reactor 2 and the second reactor 3 inserted between a connection node of the first reactor 2 and the capacitor 1 and the output terminal 7, the said capacitor 1 is configured to include the serial connected third reactor 8. This configuration makes it possible to absorb the fifth harmonic wave inside the static reactive power compensating equipment and drastically decrease the total harmonic current which flows out of the static reactive power compensating equipment.

Apart from the above-mentioned embodiment wherein the resonance frequency of the serial resonance circuit of the capacitor 1 that constitutes the capacitor circuit and the third reactor 8 is set to 300 Hz, the frequency of the fifth harmonic wave, a modified embodiment may be configured such that the electric constants be selected so that the frequency of 420 Hz, the seventh harmonic wave, is absorbed in the static reactive power compensating equipment, thereby to decrease the total harmonic current flowing out of the static reactive power compensating equipment.

Figure 3:
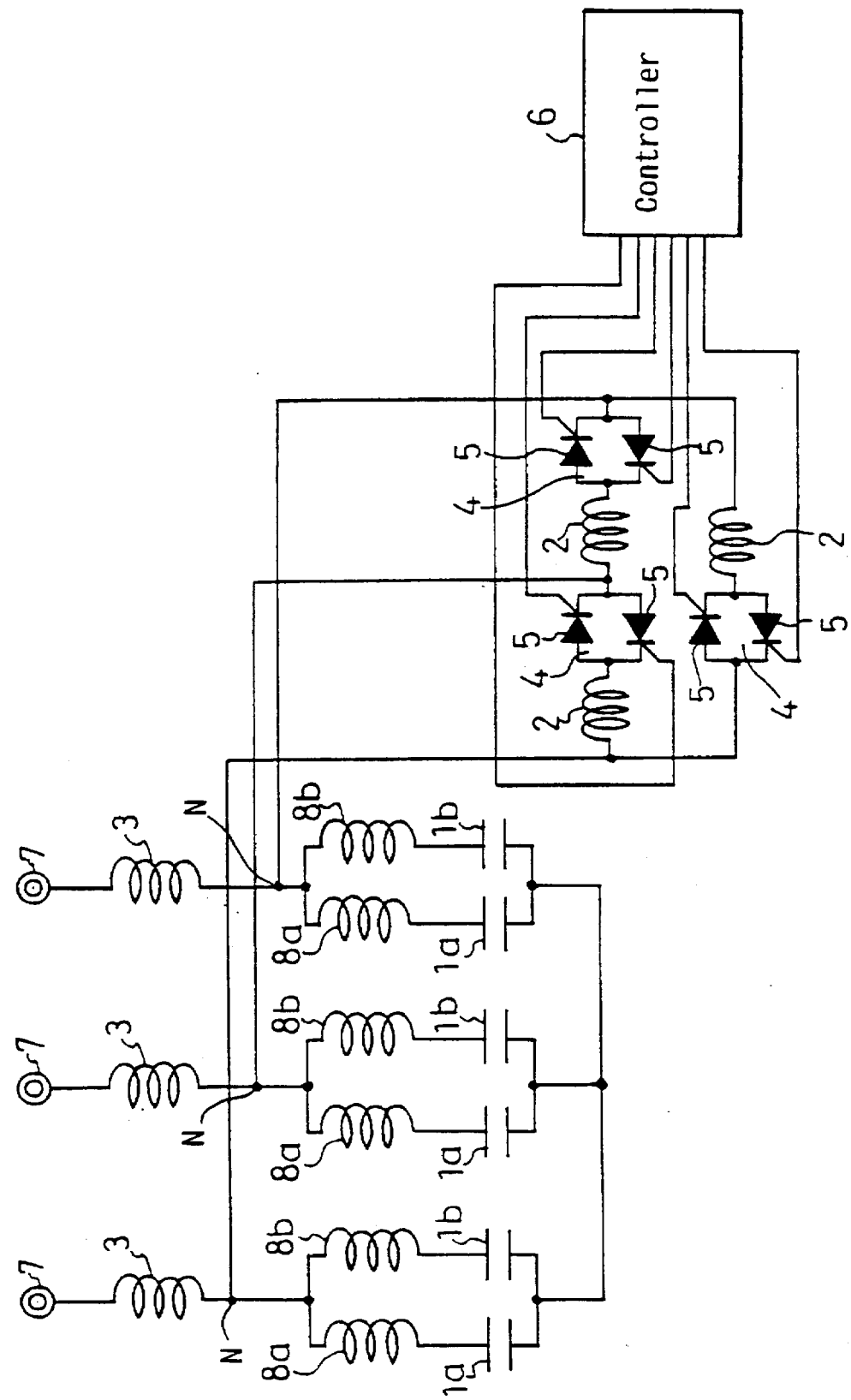
FIG. 3 is a 3-phase connection diagram of the static reactive power compensating equipment with a plurality of serial resonance circuits being connected in parallel in the first embodiment of the invention.

As another mode, various serial resonance circuits which resonate with various harmonic waves such as fifth, seventh and eleventh harmonic waves, respectively, may be connected in parallel with each other. FIG. 3 shows an embodiment configured by paralelly connecting two serial resonance circuits which respectively resonate with the fifth harmonic wave and the seventh harmonic wave. In FIGS. 3, 1a and 8a denote the capacitor and the third reactor, respectively, that constitute the serial resonance circuit which resonates with the fifth harmonic wave; and 1b and 8b denote the capacitor and the third reactor, respectively, that constitute the serial resonance circuit which resonates with the seventh harmonic wave, with other configuration being similar to that of FIG. 1. With such configuration, both the fifth harmonic wave and the seventh harmonic wave are absorbed in the static reactive power compensating equipment; and the total harmonic current flowing out of the static reactive power compensating equipment can be decreased further.

Although the above embodiments are described in the case of the electric power system operating at 60 Hz, it goes without saying that in the case of an electric power system operating at 50 Hz, the fifth harmonic wave is 250 Hz and the seventh harmonic wave is 350 Hz, and that capacitance of the capacitor 1 and inductance of the third reactor are set to such values that adapt to 50 Hz.

Second Embodiment

A second embodiment of the invention will be described below referring to FIG. 4 and FIG. 6B.

Figure 4:
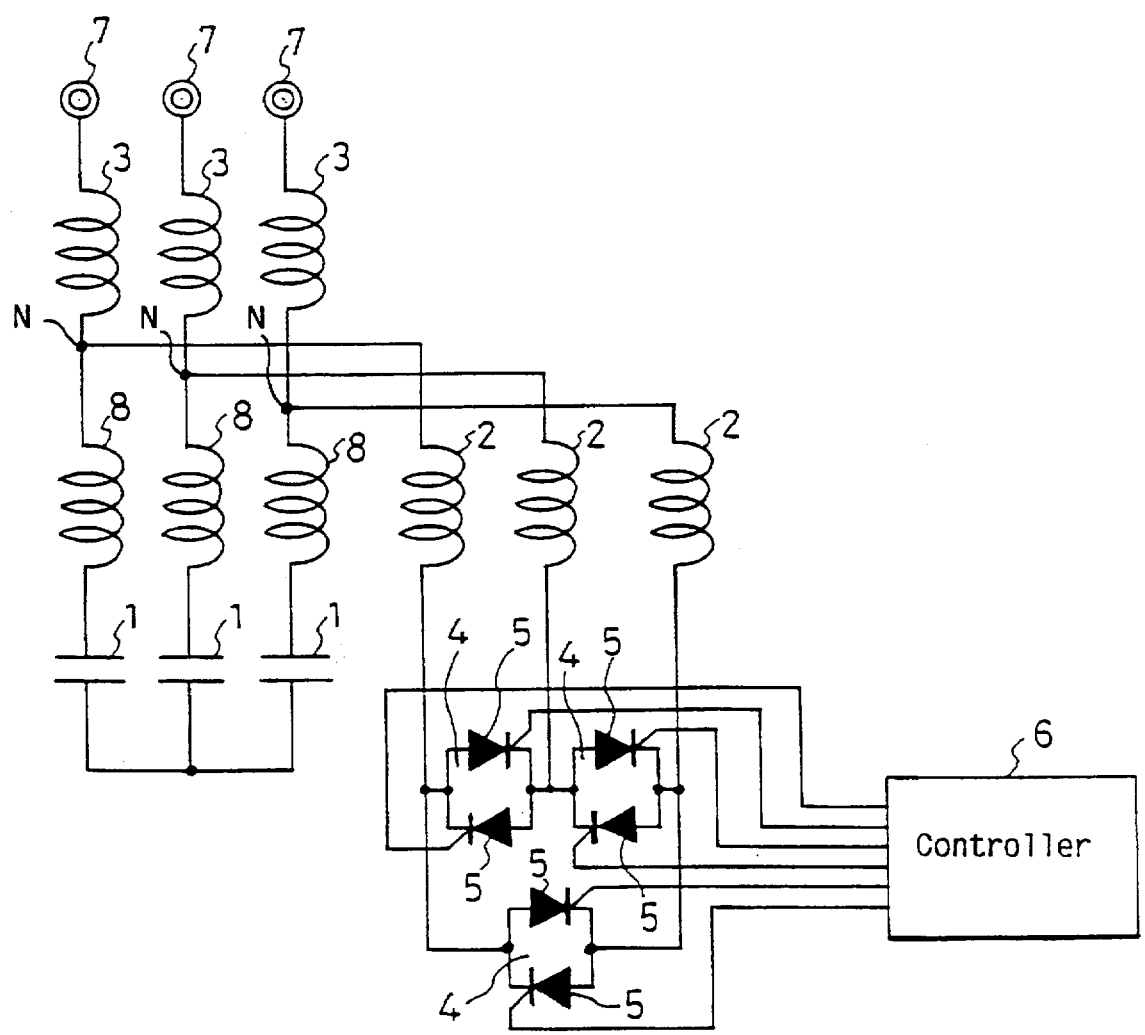
FIG. 4 is a 3-phase connection diagram of the static reactive power compensating equipment of the second embodiment of the invention.

FIG. 4 shows a 3-phase connection diagram of a static reactive power compensating equipment of the second embodiment. In this embodiment, in the 3-phase connection circuit, out of the circuit of the afore-mentioned first embodiment shown in FIG. 1, the connection of the first reactors 2 and the switching circuits 4 are altered. That is, three switching circuits 4 are connected in a Delta-connection, and to respective interconnecting points or vertexes points of the Delta-connection respective one ends of the first reactors 2 are connected in star type connection. That is, in FIG. 4, the capacitor 1, the second reactors 3, the switching circuits 4 each comprising thyristors 5 connected in reverse parallel, the controllers 6, the output terminals 7 and the third reactors 8 are connected similar to the configuration of the first embodiment shown in FIG. 1. But the connections of the first reactors 2 and the switching circuits 4 only differs from the first embodiment. Equivalent single phase connection diagram for the explanation of the operation of this embodiment is represented by FIG. 2 similarly to the first embodiment.

Operation of the second embodiment will be described below. As mentioned above, the equivalent single phase connection diagram of this second embodiment of FIG. 4 is the same as that (FIG. 1) of the first embodiment, and the operation of generating compensation current is basically the same as that of the first embodiment. Operation of this embodiment in a 3-phase circuit is characterized by the fact that the values of inductances of the first reactors 2 may be one third of those of the first embodiment. However, when the conducting periods of the switching circuits 4 exceed 120°, three phases are mutually short-circuited, thereby leading to a malfunction of the switching circuit 4. In the case of the first embodiment the respective of conduction period can be extended to 180°, because the three phases are not short-circuited even when respective conducting periods of the switching circuits 4 exceed 120° thanks to the operation of the first reactor 2. However, in this second embodiment, the maximum period of conduction is set preliminarily no larger than 120° in order to avoid the short circuiting of the three phases. This results in that capacitances of the thyristors 5 and the first rector 2 can not be utilized 100% in this embodiment.

Characteristics of the static reactive power compensating equipment of this embodiment is shown in FIG. 6B. As will be clear from FIG. 6B, although harmonic current content in the compensation current in this embodiment is a little higher than the harmonic current ratio in the first embodiment, better effect is obtainable compared to the static reactive power compensating equipment of the prior art.

According to this embodiment, as described above, an effect substantially similar to that of the first embodiment can be obtained with the first reactor of lower inductance than that, by configuring combining the delta-connected phase-control switching means and the star type-connected first reactors 2, by connecting the latters to respective vertex points of the delta-connected switching circuits 4.

When applying the present invention, either the first embodiment or the second embodiment may be selected depending on the leading and lagging current capacity to be compensated and to the design requirement for the harmonic current ratio to be suppressed.

Third Embodiment

A Third embodiment of the invention will be described below referring to FIG. 5 and FIG. 6C.

Figure 5:
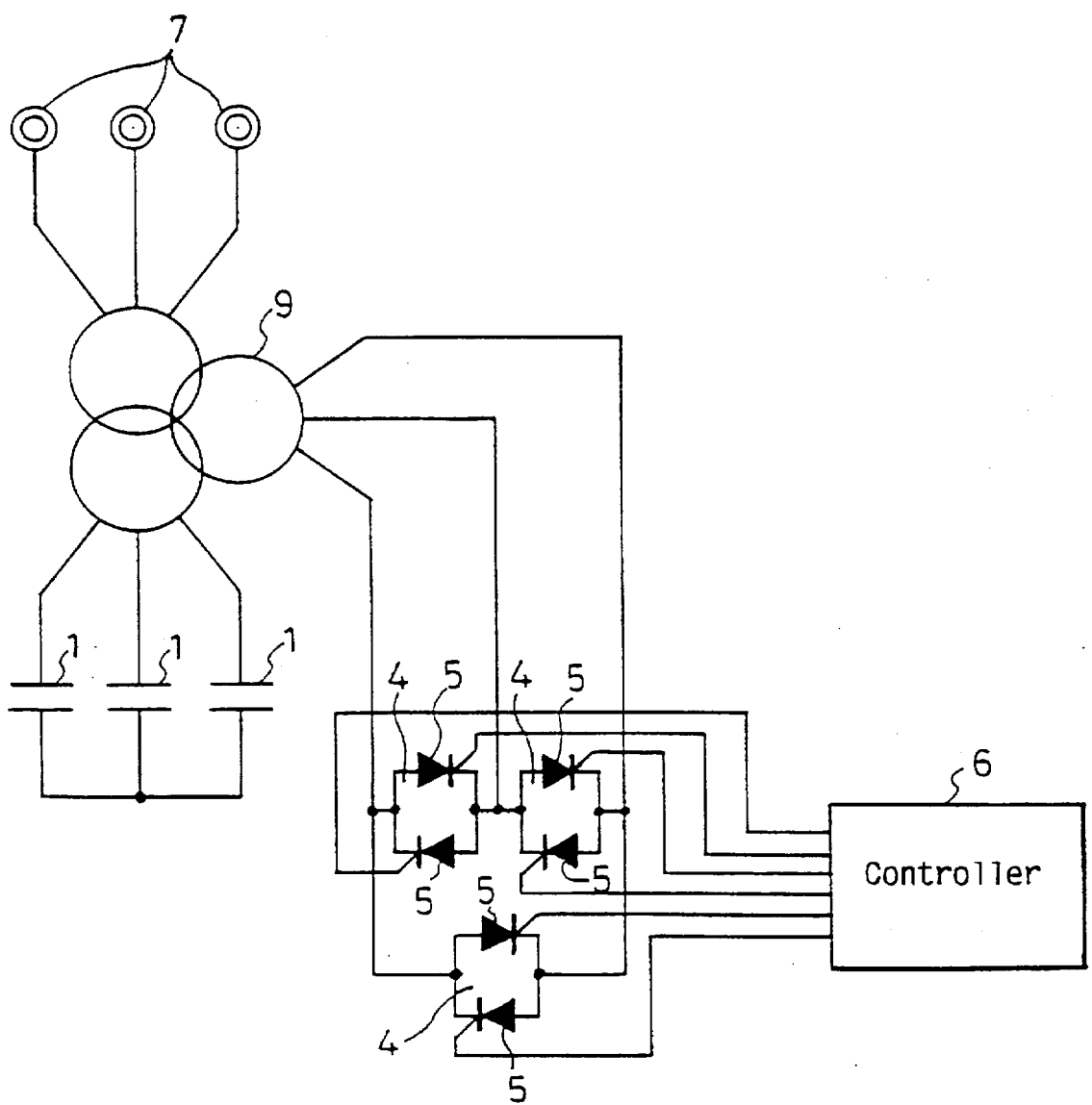
FIG. 5 is a 3-phase connection diagram of the static reactive power compensating equipment of the third embodiment of the invention.

FIG. 5 shows a 3-phase connection diagram of the static reactive power compensating equipment of the third embodiment. This embodiment is characterized by the fact that the first, second and third reactors of the second embodiment are configured by means of transformer windings having desired values of leakage inductances. That is, in FIG. 5, the capacitors 1, the switching circuits 4, the thyristors 5 and the controller 6 are similar to those of the second embodiment. The third embodiment is different from the first embodiment or the second embodiment in that the first, second and third reactors are formed or configured by means of three windings of a transformer 9 having desired values of leakage inductances.

Operation of the above-mentioned static reactive power compensating equipment of the third embodiment of FIG. 5 is almost similar to that of the second embodiment which has already been described, except that the operation of reactances is replaced with the operation of the leakage inductances of the windings of the transformer, and therefore similar description thereof will be omitted, and difference only will be elucidated.

According to the third embodiment, capacitors and switching circuits having desired voltage rating and current rating can be used in a simple configuration, by configuring the first, second and third reactors of the second embodiment by means of transformer windings having desired values of leakage inductance. Also by utilizing the transformer, it is possible to increase ability of insulation from the related electric power system and to serve various electric power systems including an extremely high voltage system.

Apart from configuring the first, second and third reactors of the second embodiment by the transformer windings having the necessary values of leakage inductance, it goes without saying that, at least one of the first, second and third reactors may be configured by means of transformer winding having leakage inductance instead of configuring all the three reactors by the transformer windings.

Apart from the connection of FIG. 5 wherein the connections of the first reactors and the switching circuits are made similar to that of the second embodiment, other connection may be made such as, connecting similarly to that of the first embodiment, as a matter of course.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A static reactive power compensating equipment comprising:

at least a first reactor having a first end and a second end;

at least one switching circuit electrically connected to a controller:

at least a second reactor having a first end electrically connected to an output terminal and a second end electrically connected to a connection node (N), wherein the at least a first reactor first end is electrically connected to the at least one switching circuit and the at least a first reactor second end is electrically connected to the node (N), thereby electrically connecting the at least a first reactor and the at least a second reactor in series;

at least one resonant circuit comprising at least a third reactor and at least a capacitor electrically connected in series, wherein the at least one resonant circuit is electrically connected to the node (N) in series with the at least a second reactor and in parallel with the at least a first reactor, and wherein the at least one resonant circuit resonates at a predetermined resonant frequency which substantially absorbs a harmonic current, thereby decreasing a total ratio of harmonic currents flowing from the static reactive power compensating equipment.

2. The static reactive power compensating equipment in accordance with claim 1, wherein at least one of said first reactor, said second reactor and said third reactor comprise windings of a transformer having a predetermined leakage inductance.

3. The static reactive power compensating equipment in accordance with claim 1, wherein for a 3-phase circuit, series connection circuits of said first reactor and said switching circuit are connected to constitute a delta connection.

4. The static reactive power compensating equipment in accordance with claim 1, wherein in the case of a 3-phase circuit, respective connection nodes of delta-connected switching circuits are connected to respective one ends of said first reactor.

5. The static reactive power compensating equipment in accordance with claim 2, wherein for a 3-phase circuit, series connection circuits of said first reactor and said switching circuit are connected to constitute a delta connection.

6. The static reactive power compensating equipment in accordance with claim 2, wherein in the case of a 3-phase circuit, respective connection nodes of delta-connected switching circuits are connected to respective one ends of said first reactor.

7. The static reactive power compensating equipment of claim 1 wherein the at least one resonant circuit absorbs a fifth harmonic current.

8. The static reactive power compensating equipment of claim 1 wherein the at least one resonant circuit absorbs a seventh harmonic current.

9. The static reactive power compensating equipment of claim 1 wherein the at least one resonant circuit absorbs an eleventh harmonic current.

10. The static reactive power compensating equipment of claim 1 wherein the at least one resonant circuit absorbs a fifth, a seventh, and an eleventh harmonic current.

* * * * *